United States Patent [19]
Corriveau et al.

[11] Patent Number: 6,038,449
[45] Date of Patent: Mar. 14, 2000

[54] METHOD AND APPARATUS FOR INTER-EXCHANGE HAND-OFF TAKING INTO ACCOUNT THE SERVICE CAPABILITIES OF THE CANDIDATE CELL

[75] Inventors: Michel Corriveau, St. Hubert; Michel Houde, St. Laurent, both of Canada

[73] Assignee: Telefonaktiebolaget L M Ericsson, Stockholm, Sweden

[21] Appl. No.: 08/956,303

[22] Filed: Oct. 22, 1997

Related U.S. Application Data

[60] Provisional application No. 60/031,448, Nov. 20, 1996.

[51] Int. Cl.[7] ........................................... H04Q 7/00
[52] U.S. Cl. .................... 455/439; 455/436; 455/432; 455/428; 455/430
[58] Field of Search ...................... 455/436, 438, 455/439, 525, 552, 553, 414, 432, 524, 428

[56] References Cited

U.S. PATENT DOCUMENTS

| | | | |
|---|---|---|---|
| 5,408,419 | 4/1995 | Wong | 455/433 |
| 5,613,213 | 3/1997 | Naddell et al. | 455/414 |
| 5,666,650 | 9/1997 | Turcotte et al. | 455/509 |
| 5,790,528 | 8/1998 | Muszynski | 455/442 |
| 5,818,871 | 10/1998 | Blakeney, II et al. | 370/220 |
| 5,857,153 | 1/1999 | Lupien | 455/422 |
| 5,901,145 | 5/1999 | Sawyer | 370/332 |

FOREIGN PATENT DOCUMENTS

WO 96/10320   4/1996   WIPO .

OTHER PUBLICATIONS

PCT Search Report, dated Jul. 21, 1998, PCT/SE97/01911.

Bremer, R.; "Inter–PLMN Handover—An Approach for a Functional Requirement Description"; IEEE Conference on Universal Personal Communications; Nov. 6–10, 1995; pp. 442–446.

Pavón, Gustavo, et al., "Comments to Parameter Directive and Parameter Request Stage 2", TIA Subcommittee TR45.2 Intersystem Operations, Oct. 7, 1996, pp. 1–4.

Broyles, Sam, "Stage 3 Description of Parameter Directive and Parameter Request Operations (Rev. 3.0)", TIA Subcommittee TR45.2 Intersystem Operations, Sep. 16, 1996, pp. 1–20.

*Primary Examiner*—Edward F. Urban
*Assistant Examiner*—Yemane Woldetatios
*Attorney, Agent, or Firm*—Jenkns & Gilchrist P.C.

[57] ABSTRACT

A cellular telephone network includes plural areas each having a plurality of cells. The cells individually supporting certain service capabilities. Inter-exchange messaging is provided for distributing from a second exchange to a first exchange information on the service capabilities supported by a cell serviced by the second exchange. Using the distributed service capability information, the first exchange may identify, in the context of a potential inter-exchange hand-off, whether to request that cells serviced by the second exchange be instructed to make verification signal strength measurements. Furthermore, responsive to received verification signal strength measurement reports, the first exchange screens candidate cells based on the distributed service capability information to select an appropriate target cell served by the second exchange for hand-off.

18 Claims, 4 Drawing Sheets

METHOD AND APPARATUS FOR INTER-EXCHANGE HAND-OFF TAKING INTO ACCOUNT THE SERVICE CAPABILITIES OF THE CANDIDATE CELL

CROSS REFERENCE TO RELATED APPLICATION

This application for patent is related to, incorporates by reference, and claims priority from, previous filed, United States Provisional Application for patent Ser. No. 60/031,448, filed Nov. 20, 1996, and entitled "Candidate Cells Service Capabilities Used for Inter-exchange Handoff Candidate Cells Selection," by Michel Corriveau and Michel Houde.

BACKGROUND OF THE INVENTION

1. Technical Field of the Invention

The present invention relates to cellular telephone networks and, in particular, to inter-exchange handoff of mobile station call communications by taking into account the service capabilities of candidate cells.

2. Description of Related Art

Cellular telephone networks support a number of known service capabilities. Such differing service capabilities relate to: voice coder support (e.g., no voice coder, VSELP, or AFR); voice privacy support (e.g., no voice privacy, voice privacy algorithm A); data privacy support (e.g., no data privacy, data privacy algorithm A); hyperband support (e.g., 800 MHZ, 1900 MHZ, dual, and individual bands (A, B, and the like) therein); and voice/data communications support (e.g., analog, digital, facsimile, half/full rate, STU-III). It is not uncommon for the cells included within the network to support different ones of those service capabilities. Thus, for example, one cell may support voice privacy while another, perhaps adjacent, cell does not.

A cellular telephone call may implicate one or a number of these service capabilities. For example, an AFR voice coder only capable dual band (800/1900 MHZ) mobile station may establish a particular call in a cell using 1900 MHZ, AFR voice coder and voice privacy service capabilities. In order for this example call to be maintained as the mobile station moves and a hand-off of the call from cell to cell occurs, each target cell must be capable of supporting 800 MHZ or 1900 MHZ, AFR voice coder and voice privacy service capabilities (i.e., the same or acceptable alternate capabilities). A mobile switching center typically has knowledge of the service capabilities of each cell it serves, and thus making intra-exchange hand-off determinations can easily take into account difference in the service capabilities supported by each cell. That mobile switching center typically does not, however, have knowledge of the service capabilities of those cells it does not serve, and thus problems are encountered in making inter-exchange hand-off determinations to a target cell capable of supporting the same (or acceptable alternate) service capabilities as the currently handling cell. There is a need then for a technique for inter-exchange distribution of information concerning the service capabilities of individual cells. There is further a need for having this service capability information considered in the context of inter-exchange hand-off to ensure continued handling of cellular telephone call which require the use of certain ones of those capabilities.

SUMMARY OF THE INVENTION

In a cellular telephone network including cells individually supporting certain service capabilities, a message is sent from a first exchange to a second exchange distributing information on the service capabilities supported by a cell serviced by that first exchange. Alternatively, upon received request issued by the first exchange, the second exchange provides the first exchange with information on the service capabilities supported by a cell serviced by that second exchange. This information on the service capabilities of other exchange serviced cells is then evaluated by the appropriate exchange in making determinations as to which cooperating exchanges should be asked to make verification signal strength measurements prior to hand-off, and also as to which candidate cells serviced by another exchange may comprise a target cell for that hand-off.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
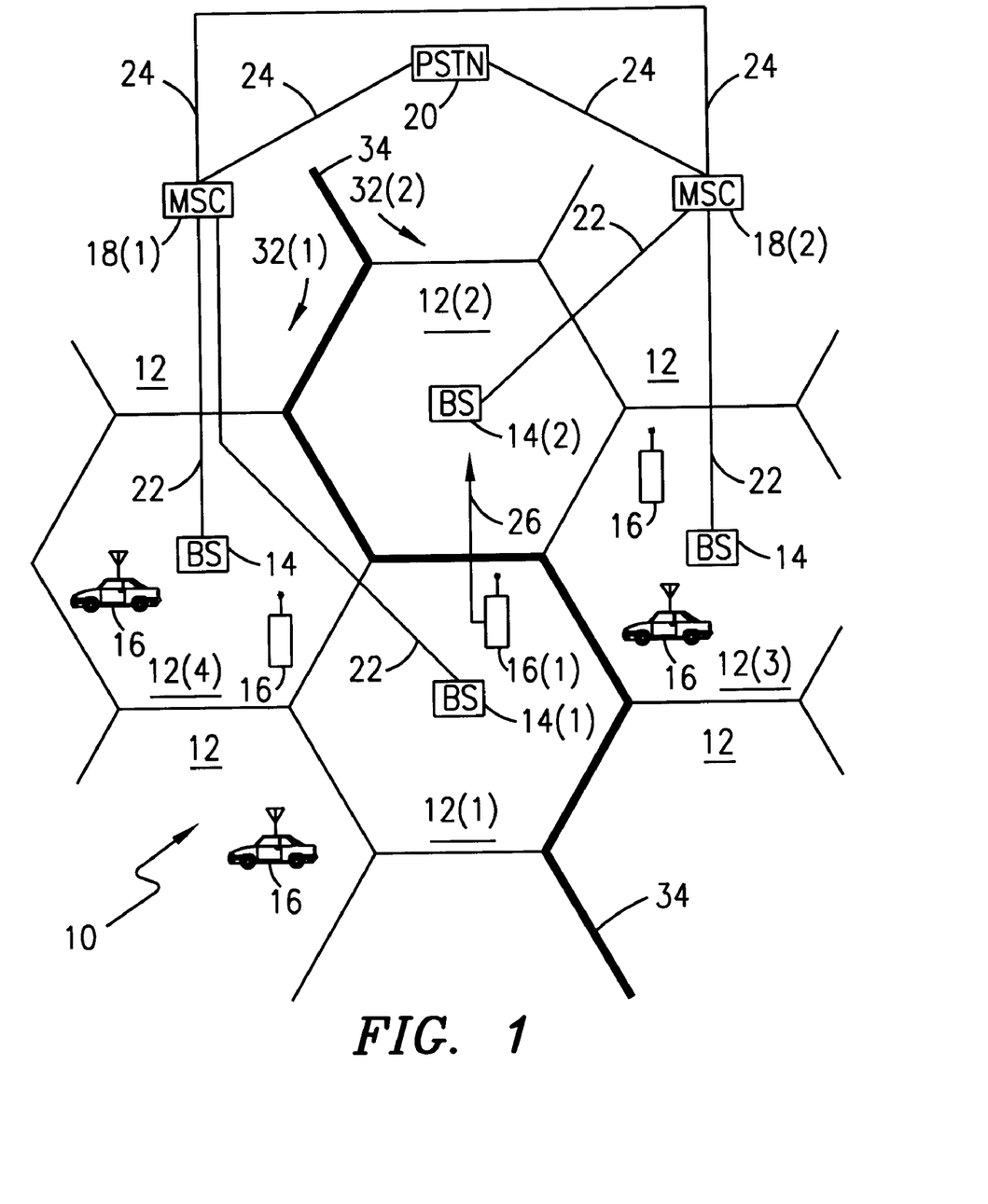
FIG. 1 is a cell diagram illustrating an exemplary cell configuration for a cellular telephone network in which the present invention may be implemented.

Reference is now made to FIG. 1 wherein there is shown a cell diagram illustrating an exemplary cell configuration for a cellular telephone network 10 in which the present invention may be implemented. The cellular telephone network 10 operates in accordance with one of a number of known air interface types including, for example, a digital time division multiple access (TDMA) protocol. In a digital TDMA cellular telephone network, for example, each cell 12 operates with an assigned set of transmission frequencies selected from one or more of the available cellular communications authorized hyperbands (e.g., 800 MHZ, 1900 MHZ, and the like) and frequency bands (A, B, and the like) therein. The set of frequencies assigned to each cell 12 includes frequencies supporting both at least one control channel and a plurality of traffic channels, with the control and traffic channels operable in either or both an analog and/or a digital mode. Sets of assigned frequencies are different for adjacent cells 12, and such sets are not repeated for use by other cells except for those cells that are far enough away from each other to minimize the likelihood of adjacent or co-channel interference.

In the network 10, a base station 14 is provided for each of the cells 12. The base stations 14 engage in simultaneous communications with plural mobile stations 16 operating roughly within the area of the associated cell 12. The control channel assigned to each cell 12 is used to carry system control signals between the base station 14 and proximately located mobile stations 16, and also to assist in the network with mobile station cell reselection. Such control signals include call originations, page signals, page response signals, location registration signals, traffic channel assignments, maintenance instructions, and cell selection or re-selection instructions. The traffic channels provided in each cell 12 are used to carry subscriber voice or data communications between the base station 14 and proximately located mobile stations 16 and also to assist in the hand-off operation.

The base stations 14 are illustrated as being positioned at or near the center of each of the cells 12. However, depending on geography and other known factors, the base stations 14 may instead be located at or near the periphery of, or otherwise away from the centers of, each of the cells 12. In such instances, the base stations 14 may broadcast and communicate with mobile stations 16 located within the cells 12 using directional rather than omni-directional antennas. Each one of the base stations 14 includes a transmitter, a receiver, and a base station controller (none shown) connected to an antenna (also not shown) in a manner and with a configuration well known in the art.

The base stations 14 further communicate via signaling links and voice trunks 22 with a central control station, commonly referred to as a mobile switching center 18, which functions to control operation of the network 10. A boundary 34 is shown in bold in FIG. 1 to differentiate between those cells 12 (collected in area 32(1)) served by a first mobile switching center 18(1), and those cells (collected in area 32(2)) serviced by a second mobile switching center 18(2). The mobile switching centers 18 are interconnected with each other and to the public switched telephone network (PSTN) 20 by signaling links and voice trunks 24. The mobile switching centers 18 operate to selectively connect subscriber voice and data communications to the mobile stations 16 through its base stations 14. Thus, the mobile switching center 18 controls system operation through and in response to the transmission of control signals over the control channels to set-up on the traffic channels calls that are either originated by or terminated at the mobile stations 16. The mobile switching center 18 further controls, through and in response to control and traffic channel transmissions, the handoff of a subscriber communication from a traffic channel of one cell 12 to a traffic channel of another cell as the subscriber mobile station 16 roams throughout the cellular service area during an ongoing communication.

The cellular network 10 may support through its cells 12 any one or more of a number of known service capabilities. Such differing service capabilities relate to: voice coder support (e.g., no voice coder, VSELP, or AFR); voice privacy support (e.g., no voice privacy, or voice privacy algorithm A); data privacy support (e.g., no data privacy, or data privacy algorithm A); hyperband support (e.g., 800 MHZ, 1900 MHZ, dual, and individual bands (A, B, and the like) therein); and voice/data communications support (e.g., analog, digital, facsimile, half/full rate, or STU-III). It is not uncommon, however, for the cells 12 included within the network 10, even in some instances within one area 32, to support different ones of those service capabilities. A mobile switching center 18 has knowledge of the service capabilities of each cell 12 it serves (i.e., those cells within the area 32 associated with the mobile switching center). That mobile switching center typically does not, however, have knowledge of the service capabilities of those cells 12 it does not serve (i.e., those cells within the area 32 associated with another mobile switching center).

Figure 2:
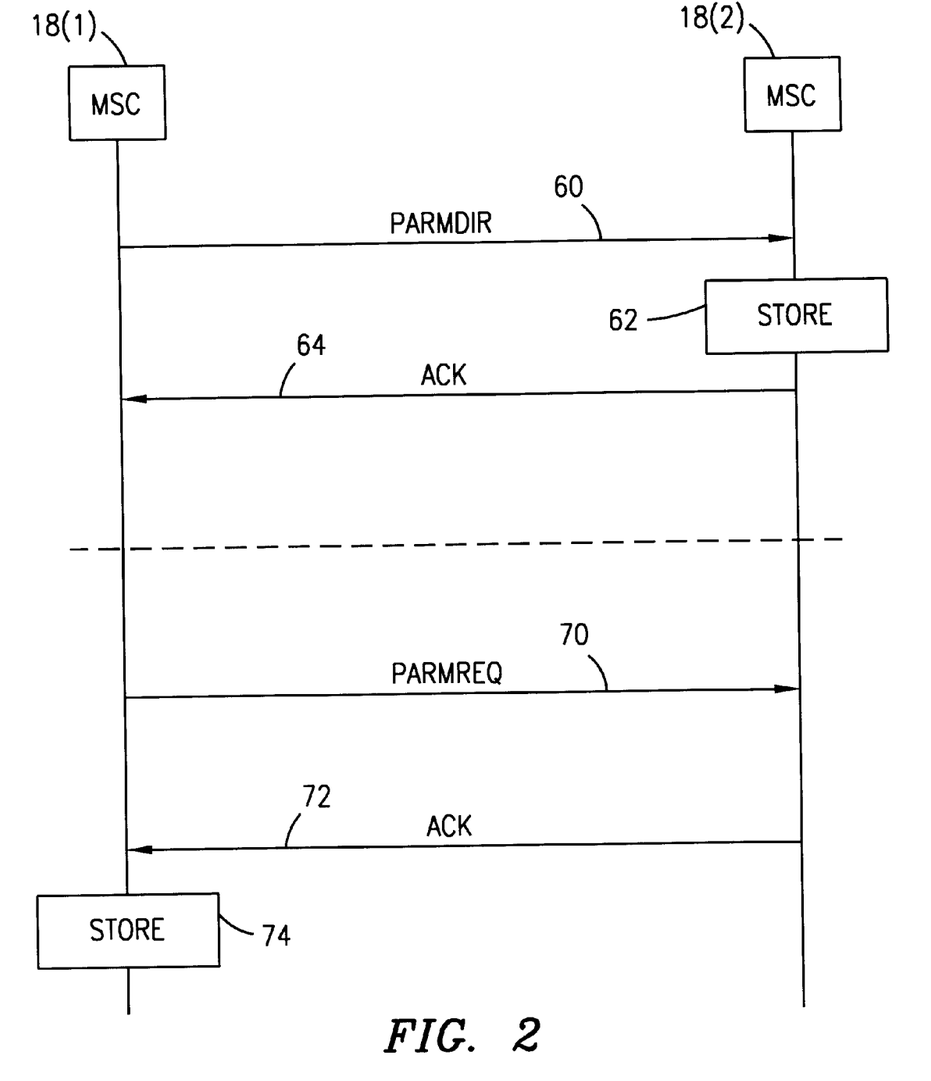
FIG. 2 is a signal flow and network operation diagram illustrating operation of the network of FIG. 1 in connection with a distribution of cell service capability information between exchanges.

Reference is now made to FIG. 2 wherein there is shown a signal flow and network operation diagram illustrating operation of the network 10 of FIG. 1 in connection with a distribution of service capability information between mobile switching centers 18. In a first scenario illustrated near the top of FIG. 2, a first mobile switching center 18(1) transmits a parameter directive (PARMDIR) message 60 to each of its cooperating (i.e., neighboring) mobile switching centers 18, including mobile switching center 18(2). Included within this message 60, the first mobile switching center 18(1) specifies the service capabilities of one or more cells 12 it serves (i.e., a cell or cells within the area 32 associated with the mobile switching center). The message 60 may be sent by a mobile switching center 18 at any time, for example, after being updated to support a new service, or on a periodic basis. This service capability information contained in message 60 concerning the identified cell 12 or list of cells is then stored (action 62) by the receiving mobile switching centers 18 in connection with, for example, the making of inter-exchange hand-off determinations as discussed in more detail herein. The receiving mobile switching centers 18 then reply back to the message 60 originating mobile switching center 18(1) with an acknowledgment (ACK) message 64. In a second scenario illustrated near the bottom of FIG. 2, a first mobile switching center 18(1) transmits a parameter request (PARMREQ) message 70 to a cooperating (i.e., neighboring) mobile switching center 18, such as mobile switching center 18(2). This request message 70 may be sent by a mobile switching center 18 at any time, for example, on a periodic basis. The receiving mobile switching center 18(2) then replies back to the message 70 originating mobile switching center 18(1) with an acknowledgment (ACK) message 72. Included within this message 72, the second mobile switching center 18(2) specifies the service capabilities of one or more cells 12 it serves (i.e., a cell or cells within the area 32 associated with the mobile switching center). This service capability information concerning the identified cell 12 or list of cells is then stored (action 74) by the requesting mobile switching center 18(1) in connection with, for example, the making of inter-exchange hand-off determinations as discussed in more detail herein.

Reference is now once again made to FIG. 1. As the mobile stations 16 move within the service area of the network 10, instances arise where a mobile station passes between two cells 12 within a single area 32, or from one cell in a first area 32(1) to another cell in a second area 32(2). In moving between the cells 12, the mobile stations 16, in conjunction with base station 14 information and orders exchanged with and between the mobile switching centers 18, have an opportunity through hand-off to change the base station through which cellular radio communications are being effectuated. For example, mobile station 16(1) is shown moving in the direction of arrow 26 from area 32(1) into area 32(2). Because the cells 12 of the network 10 may each support different service capabilities, it is important in such instances of inter-exchange hand-off that the mobile switching centers 18 be informed not only of the services being utilized for the call in the currently serving cell, but also of the service capabilities supported within the target cell. If the service capabilities of the candidate cell do not support the services being utilized for the call in the currently serving cell, a handoff to that candidate cell may result in a dropped call.

Figure 3A:
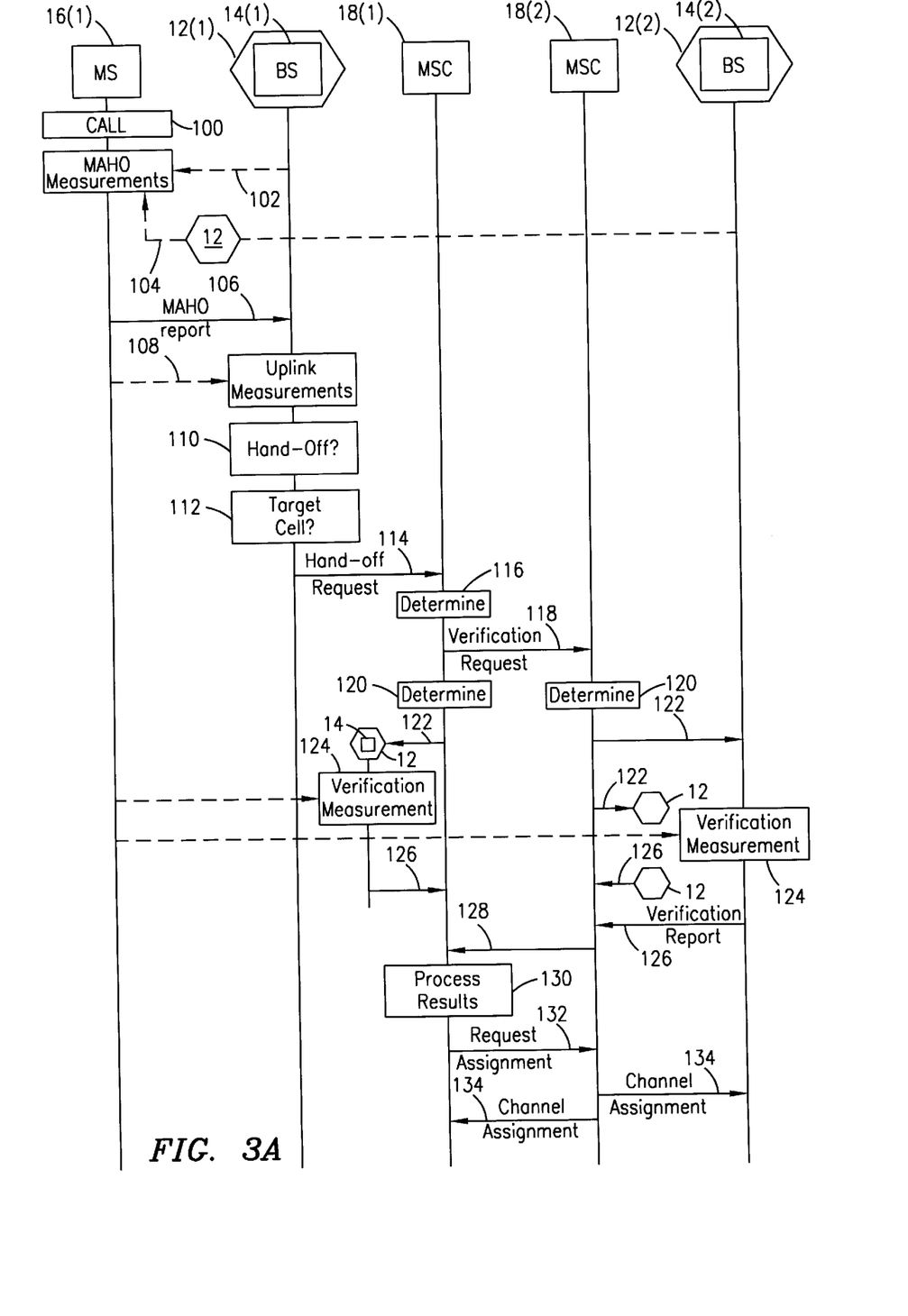
FIGS. 3A–3B are signal flow and network operation diagrams illustrating operation of the network of FIG. 1 in connection with a verification-type hand-off of a mobile station taking into account the service capabilities of hand-off candidate cells.
Figure 3B:
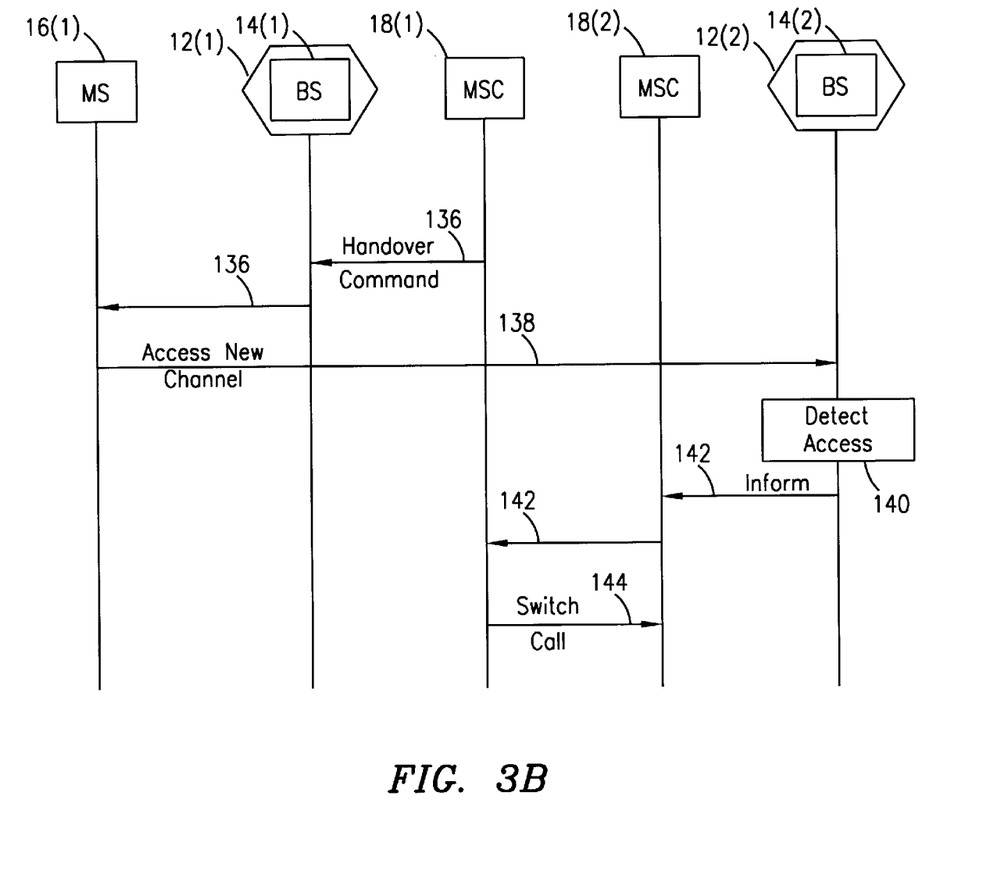

Reference is now made in combination to FIGS. 1 and 3A–3B, wherein FIGS. 3A–3B are signal flow and network operation diagram illustrating operation of the network 10 of FIG. 1 in connection with a verification-type hand-off of a mobile station 16(1), taking into account service capabilities, from a cell 12(1) within a first area 32(1) generally towards cell 12(2) within a second area 32(2). The mobile station 16(1) is currently engaged in a call 100 implicating certain service capabilities (such as hyperband, voice coder, privacy, and the like). The mobile station 16(1), operating if capable in accordance with known mobile assisted hand-off (MAHO) principles, periodically makes downlink signal strength measurements 102 on the traffic channel (of cell 12(1)) that is currently being used, and also periodically makes downlink signal strength measurements 104 on the control channels of network identified cells 12, including cell 12(2), which neighbor the cell 12(1). These signal strength measurements are reported 106 to the base station 14(1) for the currently serving cell 12(1). The base station 14(1) concurrently makes uplink signal strength measurements 108 on the traffic channel that is currently being used by the mobile station 16(1).

The base station 14(1) processes the mobile station 16(1) reported 106 downlink signal strength measurements (102 and 104), if available, and the base station made uplink signal strength measurements (108) to determine first whether a hand-off is necessary (action 110) and second, if yes, to which candidate cells the hand-off could and/or should preferably occur (action 112). In this example, it is assumed that the base station 14(1) determines 110 from deteriorating measured uplink and/or downlink signal strengths that a hand-off is necessary. It is further assumed that an identification 112 is made of a plurality of candidate cells 12 for hand-off. These candidate cells 12 may include cells in the same first area 32(1) as the current cell 12(1), as well as cells in other areas 32, such as cell 12(2) in second area 32(2). A request 114 for hand-off including information comprising an identification of the currently serving cell 12(1), the traffic channel being used for communication with mobile station 16(1) in cell 12(1), the time slot (for a digital traffic channel) carrying the cellular communication, and the list of potential candidate cells 12 for hand-off, is then sent by the base station 14(1) to the serving mobile switching center 18(1).

With respect to inter-exchange signaling and a potential for inter-exchange hand-off, the currently serving mobile switching center 18(1) then determines in action 116, based on the stored (actions 62 and/or 74 of FIG. 2) service capability information for the cells of other mobile switching centers 18, whether a cooperating mobile switching center serving serves at least one cell 12 with sufficient service capability (or acceptable alternate service capability) to continue handling the call 100 after a hand-off. If so, the mobile switching center 18(1) signals 118 the cooperating mobile switching center 18 requesting verification of served base station 14 communications capability with the mobile station 16(1). The signal 118, like the request 114 sent by the base station 14(1), includes information comprising an identification of the currently serving cell 12(1), the traffic channel being used for communication with mobile station 16(1) in cell 12(1), and the time slot (for a digital traffic channel) carrying the cellular communication. For example, if the call 100 requires an AFR voice coder and 1900 MHZ band, at least one cell 12 served by the cooperating mobile switching center 18, such as cell 12 (2) for mobile switching center 18(2), must also support AFR voice coder and 1900 MHZ service capabilities in order for the mobile switching center 18(1) to send the signal 118. It is of course understood that an acceptable cell may comprise a cell having acceptable alternate service capabilities if available. If no such cell 12 exists served by the cooperating mobile switching center 18, signaling and processing resources are conserved in connection with the potential hand-off by not sending the signal 118 to that mobile switching center.

Responsive to receipt of the signal 118, the cooperating mobile switching center 18, such as mobile switching center 18(2), determines in action 120 from the identification of the cell 12(1), which of its served cells, such as cell 12(2), are neighbors (i.e., candidate cells) for hand-off. The cooperating mobile switching center 18(2) then signals 122 the base station 14, such as base station 14(2), for each of its served candidate cells, such as cell 12(2), to make a verifying signal strength measurement (action 124) on the traffic channel currently being used by the mobile station 16(1) in the currently serving cell 12(1). It is recognized that a determined neighbor cell 12 identified for receipt of the signal 122 may not necessarily have the service capabilities (either same or acceptable alternate) necessary for supporting the call 100 after hand-off. This is because the cooperating exchanges 18 send the signals 122 to each candidate cell either (1) without being able to know which of its cells satisfy the service capabilities currently used by the mobile station 16(1) in cell 12(1), or (2) without being provided in signal 118 with the list of cells for the cooperating exchange that were selected in action 116 by the serving mobile switching center 18(1).

At or about the same time, the mobile switching center 18(1) has similarly identified in action 120 which of its served cells 12 are neighbors (i.e., candidate cells) to cell 12(1) for hand-off. The mobile switching center 18(1) then similarly signals 122 the base station 14 for each of its served candidate cells 12 to make a verifying signal strength measurement (action 124) on the traffic channel currently being used by the mobile station 16(1) in the currently serving cell 12(1). It is again recognized that a determined neighbor cell 12 identified for receipt of the signal 122 may not necessarily have the service capabilities necessary for supporting the call 100 after hand-off. This is because the cooperating exchange 18 sends typically the signal 122 blindly to each candidate cell without making a service capabilities evaluation.

In another embodiment of the present invention, the signal 118 includes information not only comprising an identification of the currently serving cell 12(1), the traffic channel being used for communication with mobile station 16(1) in cell 12(1), and the time slot (for a digital traffic channel) carrying the cellular communication, but also an identification of the particular neighboring cells 12 served by the cooperating mobile switching center 18 having the service capabilities (either the same or acceptable alternate) necessary for supporting the call 100 after hand-off. This information is obtained by the mobile switching center 18(1) during the processing of action 116 from the stored (actions 62 and/or 74 of FIG. 2) service capability information for the cells of other mobile switching centers 18. It is recognized then that in this embodiment only those cells 12 served by the cooperating exchange 18 capable of supporting the call 100 from a service capability (or acceptable alternate service capability) perspective after hand-off are instructed by signal 122 to make verifying signal strength measurements (action 124) on the traffic channel currently being used by the mobile station 16(1) in the currently serving cell 12(1). In a similar manner, the mobile switching center 18(1) intelligently instructs by signal 122 only those cells 12 it serves that are capable of supporting the call 100 from a service capability (or acceptable alternate service capability) perspective after hand-off to make verifying signal strength measurements (action 124) on the traffic channel currently being used by the mobile station 16(1) in the currently serving cell 12(1).

Each base station 14 instructed by a received signal 122 in either of the foregoing embodiments then reports 126 the results of the verification signal strength measurement to their serving the mobile switching center 18. In the case of reports 126 made to cooperating mobile switching centers 18, such as mobile switching center 18(2), the reported verification signal strength measurements are forwarded 128 on to the mobile switching center 18(1). The verification signal strength measurement results are then processed (action 130) by the mobile switching center 18(1) to determine which one of the candidate cells 12 comprises the best (i.e., the target) cell for hand-off of the call 100. This determination takes into account not only the success and strength of the verification signal strength measurement, but also the service capabilities of the candidate cells 12 and the service requirements of the call 100. Accordingly, the currently serving mobile switching center 18(1) determines in action 130, based on the stored (actions 62 and/or 74 of FIG. 2) service capability information for the various candidate cells 12 of other mobile switching centers 18, whether a cell from which a verification signal strength measurement report 126 was received could support the same or acceptable alternate service capability implicated by the call 110 after hand-off. If not, that cell is eliminated in action 130 from further hand-off consideration. Of the remaining candidate cells 12 capable of supporting the call 100, a best (for example, chosen based on highest measured verification signal strength) one of the cells, such as cell 12(2), is selected in action 130 as the target cell for hand-off.

The mobile switching center 18(1) signals 132 the mobile switching center 18(2) serving the target cell 12(2) requesting assignment (and reservation) of a traffic channel (and time slot therein for a digital traffic channel) for hand-off of the call 100. This channel selection determination is made to ensure that the proper service capabilities (or acceptable alternate service capabilities) are provided for supporting the call. Both the base station 14(2) and mobile switching center 18(1) are then informed 134 of the assignment by the mobile switching center 18(2) of the traffic channel in the target cell 12(2). The mobile switching center 18(1) then signals 136 the mobile station 16(1) via the base station 14(1) for the currently serving cell 12(1) with a handover command directing the mobile station to switch to the assigned traffic channel (and time slot therein if appropriate) in the target cell 12(2). The mobile station 16(1) then tunes to and accesses 138 the assigned traffic channel (in the proper time slot). When the base station 14(2) detects the mobile station access (action 140), the mobile switching centers 18(1) and 18(2) are informed 142, and the call 100 is switched 144 to the mobile switching center 18(2) for further handling to complete the hand-off procedure.

The operation of the network 10 of FIG. 1 in connection with the foregoing verification-type hand-off procedure illustrated in FIGS. 3A and 3B may be better understood by reference to the following example.

In this example, a dual band (800/1900 MHZ) mobile station 16(1) is engaged in a call 100 requiring 1900 MHZ, an AFR voice coder and voice privacy in cell 12(1). As the mobile station 16(1) moves, the base station 14(1) processes available signal strength measurements (102, 104 and/or 108) and determines that a hand-off is necessary 110. The base station 14(1) further determines that cells 12(2), 12(3) and 12(4), among perhaps other neighboring cells 12, comprise candidate cells for that hand-off. The base station 14(1) then requests 114 a hand-off from the mobile switching center 18(1).

The mobile switching center 18(1) then determines (action 116), with respect to an inter-exchange hand-off to a cell 12 within area 32(2), whether any of the cells served by mobile switching center 18(2) have the same (1900 MHZ, AFR and voice privacy) or acceptable alternate service capability for supporting the call 100. In this example, cell 12(2) has service capability support for 1900 MHZ, AFR and voice privacy, while cell 12(3) has service capability support for 1900 MHZ, AFR voice coder and no voice privacy. It should be recognized in this context that a cell having 800 MHZ, AFR coder and voice privacy would comprise a cell having acceptable alternate service capability. Thus, the determination of action 116 is satisfied by the service capabilities of cell 12(2), and the mobile switching center 18(1) signals 118 the mobile switching center 18(2) with a verification request. Responsive to the request 118, the mobile switching center 18(2) determines in action 120 which of its cells 12 comprise neighbor cells to cell 12(1). The appropriate cells 12 include cells 12(2) and 12(3), among perhaps other cells. An instruction is then sent with signal 122 to cells 12(2) and 12(3) requesting that they make verification signal strength measurements 124. Note that the instruction of signal 122 is given to cell 12(3) even though it cannot support the call 100. In the alternative embodiment, the signal 118 provides the candidate cell list identifying cells for which measurements are requested. In this example, the list would include cell 12(2), but not cell 12(3), and the instruction of signal 122 is then sent only to cell 12(2).

In the meantime, the mobile switching center 18(1) similarly determines in action 120 which of its cells 12 comprise neighbor cells to cell 12(1). The appropriate cells 12 include cell 12(4), among perhaps other cells. An instruction is then sent with signal 122 to cell 12(4) requesting that it make a verification signal strength measurement 124. Note that the instruction of signal 122 may be given to other cells 12 served by mobile switching center 18(1) even though they cannot support the call 100. In the alternative embodiment, the processing determination 120 further identifies the particular cells, such as cell 12(4), that can support the call 100, and the signal 122 is sent only to those cells.

A request through signals 122 is then made for each base station 14 to perform a verifying signal strength measurement (action 124), and report 126 (and 128) the results back to the mobile switching center 18(1). These reports 126 and 128 are returned from each of the neighboring cells 12, including those which do not have the same (1900 MHZ, AFR and voice privacy) or an acceptable alternate service capability for supporting the call 100. In the alternative embodiment, the reports 126 (and 128) are received only from those cells 12, like cells 12(2) and 12(4) which have the same (1900 MHZ, AFR and voice privacy) or acceptable alternate service capability for supporting the call 100. Again, an acceptable alternate service capability cell in this example would comprise a cell having 800 MHZ, AFR voice coder and voice privacy.

The reported verifying signal strength measurements are then processed in action 130 to determine, taking into account not only the success and strength of the verification signal strength measurement, but also the service capabilities of the candidate cells 12 and the service requirements of the call 100, which one of the candidate cells 12 comprises the best (i.e., the target) cell for hand-off of the call 100. In the present example, it is assumed that cell 12(2) in area 32(2) is the best cell for hand-off. The mobile switching center 18(2) is then signaled 132 to request assignment (and reservation) of a traffic channel for hand-off to the target cell 12(2). Following channel assignment 134, a handover command 136 is sent to the mobile station 16(1) via the base station 14(1). The assigned traffic channel is then accessed 138 by the mobile station 16(1), and the call is switched 144 to the mobile switching center 18(2) for further handling to complete the hand-off procedure.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A cellular telephone network, comprising:
    a first cell supporting a cellular call implicating certain service capabilities;
    a first exchange serving the first cell;
    a plurality of second cells comprising neighboring cells of the first cell, only certain ones of the second cells supporting the same or acceptable alternate certain service capabilities implicated by the cellular call;
    a second exchange serving the plurality of second cells; and
    communications means for distributing information from the second exchange to the first exchange prior to a handoff assessment concerning the service capabilities supported by the plurality of second cells for subsequent use by the first exchange in assessing prior to ordering handoff as to whether any of the plurality of second cells should be considered by the first exchange as potential target cells for an inter-exchange hand-off of the cellular call from the first cell based on whether the distributed information indicates that the certain ones of the second cells support the same or acceptable alternate cellular call implicated certain service capabilities as the first cell.

2. The network as in claim 1 further including the first exchange processing the distributed information concerning the service capabilities supported by the plurality of second cells in assessing a potential inter-exchange hand-off to selectively issue an inter-exchange request to the second exchange for the second cells to make verification signal strength measurement with respect to the cellular call, the inter-exchange request selectively issued only if, based on the distributed information, at least one of the second cells supports the same or acceptable alternate cellular call implicated certain service capabilities as the first cell.

3. The network as in claim 1 further including the first exchange processing the distributed information concerning the service capabilities supported by the plurality of second cells in assessing a potential inter-exchange hand-off to selectively choose one of the second cells as a target cell for hand-off of the cellular call, the choice comprising a selected certain one of the second cells which also supports the same or acceptable alternate cellular call implicated certain service capabilities as the first cell.

4. The network as in claim 1 wherein the communications means comprises means for having the first exchange request information from the second exchange prior to a handoff assessment concerning the service capabilities supported by the plurality of second cells.

5. The network as in claim 4 wherein the communications means comprises means for having the second exchange distribute information to other exchanges including the first exchange prior to a handoff assessment concerning the service capabilities supported by the plurality of second cells.

6. In a cellular telephone network including:
    a first exchange area having a first cell supporting a cellular call implicating certain service capabilities; and
    a second exchange area having a plurality of second cells comprising neighboring cells of the first cell, only certain ones of the second cells supporting the same or acceptable alternate certain service capabilities implicated by the cellular call;
    a method for inter-exchange hand-off measurement, comprising the steps of:
        providing information from the second exchange area to the first exchange area prior to a handoff assessment concerning the service capabilities supported by each of the plurality of second cells;
        evaluating by the first exchange area of the information concerning the service capabilities in assessing whether any of the second cells should be considered by the first exchange area as potential target cells for handoff; and
        ordering by the first exchange area the second cells of the second exchange area neighboring the first cell to perform verification signal strength measurements on the cellular call, the step of ordering implemented only if the evaluation indicates that at least one of the second cells supports the same or acceptable alternate cellular call implicated certain service capabilities as the first cell.

7. The method as in claim 6 further including the steps of:
    processing by the first exchange area of the information concerning the service capabilities; and
    selectively choosing one of the second cells as a target cell for hand-off of the cellular call, the chosen second cell comprising a selected certain one of the second cells which also supports the same or acceptable alternate cellular call implicated certain service capabilities as the first cell.

8. In a cellular telephone network including:
    a first exchange area; and
    a second exchange area having a plurality of second cells each supporting certain service capabilities;
    a method for inter-exchange information distribution, comprising the step of:
        sending information from the second exchange area to the first exchange area concerning the service capabilities supported by the plurality of second cells for subsequent use by the first exchange area in assessing whether any of the plurality of second cells should be considered by the first exchange area as potential target cells for an inter-exchange hand-off of a cellular call implicating certain service capabilities from the first cell based on whether the sent information indicates that the certain ones of the second cells support the same or acceptable alternate cellular call implicated certain service capabilities.

9. The method as in claim 8 wherein the step of sending comprises the step of:
    having the first exchange area request information from the second exchange area concerning the service capabilities supported by the plurality of second cells.

10. The method as in claim 8 wherein the step of sending comprises the step of:
    having the second exchange area distribute information to other exchange areas including the first exchange area concerning the service capabilities supported by the plurality of second cells.

11. A method for operating a cellular telephone network, comprising the steps of:
    detecting with respect to a mobile station cellular call in a first cell of a first exchange area a need to perform a hand-off, the cellular call implicating certain service capabilities;

identifying by the first exchange area whether at least one of a plurality of second cells of a second exchange area neighboring the first cell supports the same or acceptable alternate cellular call implicated certain service capabilities as the first cell;

requesting from the second exchange area that each of its second cells neighboring the first cell perform a verification signal strength measurement on the cellular call if the step of identifying is satisfied;

reporting results of the second cells verification signal strength measurements to the first exchange area;

processing by the first exchange area of the reported results of the requested verification signal strength measurement to identify one of the second cells as a target cell for hand-off of the cellular call, the identified second cell comprising a selected certain one of the second cells which also supports the same or acceptable alternate cellular call implicated certain service capabilities as the first cell; and inter-exchange area handing-off of the cellular call to the selected certain one of the second cells.

12. The method as in claim 11 further including the step of sending information from the second exchange area to the first exchange area prior to a handoff assessment concerning the service capabilities supported by the plurality of second cells.

13. The method as in claim 12 wherein the step of sending comprises the step of:

having the first exchange area request information from the second exchange area prior to a handoff assessment concerning the service capabilities supported by the plurality of second cells.

14. The method as in claim 12 wherein the step of sending comprises the step of:

having the second exchange area distribute information to other exchange areas including the first exchange area prior to a handoff assessment concerning the service capabilities supported by the plurality of second cells.

15. A method for operating a cellular telephone network, comprising the steps of:

detecting with respect to a mobile station cellular call in a first cell of a first exchange area a need to perform a hand-off, the cellular call implicating certain service capabilities;

processing previously acquired knowledge information by the first exchange area concerning the service capabilities supported by a plurality of second cells of a second exchange area neighboring the first cell in view of reported verification signal strength measurements made on the cellular call to identify one of the second cells as a target cell for hand-off of the cellular call, the identified second cell comprising a selected certain one of the second cells which also supports the same or acceptable alternate cellular call implicated certain service capabilities as the first cell; and inter-exchange area handing-off of the cellular call to the selected certain one of the second cells.

16. The method as in claim 15 further including the step of having second cells neighboring the first cell perform a verification signal strength measurement on the cellular call prior to inter-exchange area hand-off.

17. The method as in claim 16 wherein the step of having second cells neighboring the first cell perform verification signal strength measurements comprises the steps of:

identifying whether at least one of the plurality of second cells of the second exchange area neighboring the first cell supports the same or acceptable alternate cellular call implicated certain service capabilities as the first cell;

requesting from the second exchange area that each of its second cells neighboring the first cell perform the verification signal strength measurement on the cellular call if the step of identifying is satisfied; and reporting results of the second cells verification signal strength measurements to the first exchange area.

18. The method as in claim 16 wherein the step of having second cells neighboring the first cell perform verification signal strength measurements comprises the steps of:

identifying the ones the plurality of second cells of a second exchange area neighboring the first cell which support the same or acceptable alternate cellular call implicated certain service capabilities as the first cell;

requesting from the second exchange area that each of its identified supporting second cells neighboring the first cell perform a verification signal strength measurement on the cellular call; and reporting results of the identified supporting second cells verification signal strength measurements to the first exchange area.

* * * * *